United States Patent [19]
King et al.

[11] Patent Number: 5,345,589
[45] Date of Patent: Sep. 6, 1994

[54] CENTRALIZED MONITORING OF ACTIVITY IN A DISTRIBUTED PROCESSING SYSTEM

[75] Inventors: Rodman King, Fremont; Carl Strickland, Saratoga; Gerald A. Smith, Belmont; Elaine Hamada, San Jose; Charles H. Jolissaint, Sunnyvale, all of Calif.

[73] Assignee: Rolm Company, Santa Clara, Calif.

[21] Appl. No.: 12,976

[22] Filed: Feb. 2, 1993

Related U.S. Application Data

[63] Continuation of Ser. No. 514,986, Apr. 26, 1990, abandoned.

[51] Int. Cl.$^5$ .................... G06F 13/00; G06F 11/30
[52] U.S. Cl. .................... 395/650; 395/200; 364/DIG. 2; 364/919; 364/931.43; 364/960
[58] Field of Search .......................... 395/200

[56] References Cited

U.S. PATENT DOCUMENTS

| | | | |
|---|---|---|---|
| 4,831,582 | 5/1989 | Miller et al. | 364/900 |
| 4,893,318 | 1/1990 | Potash et al. | 375/109 |
| 4,972,367 | 11/1990 | Burke | 364/900 |
| 5,101,402 | 3/1992 | Chiu et al. | 370/17 |

OTHER PUBLICATIONS

Bharat K. Bhargava, "Concurrency Control and Reliability in Distributed Systems", 1987, pp. 1–84.

*Primary Examiner*—Gareth D. Shaw
*Assistant Examiner*—Kakali Chaki
*Attorney, Agent, or Firm*—Michael B. Einschlag

[57] ABSTRACT

Method for centralized monitoring of activity in a distributed processing system which permits a monitor to decipher the relative time sequence of events which occur in the distributed processing system. The method includes the step of generating information which can be used to decipher the relative time sequence of events, which information is appended to activity status messages, and the step of transmitting this information, along with the activity status messages, to the monitor.

12 Claims, 2 Drawing Sheets

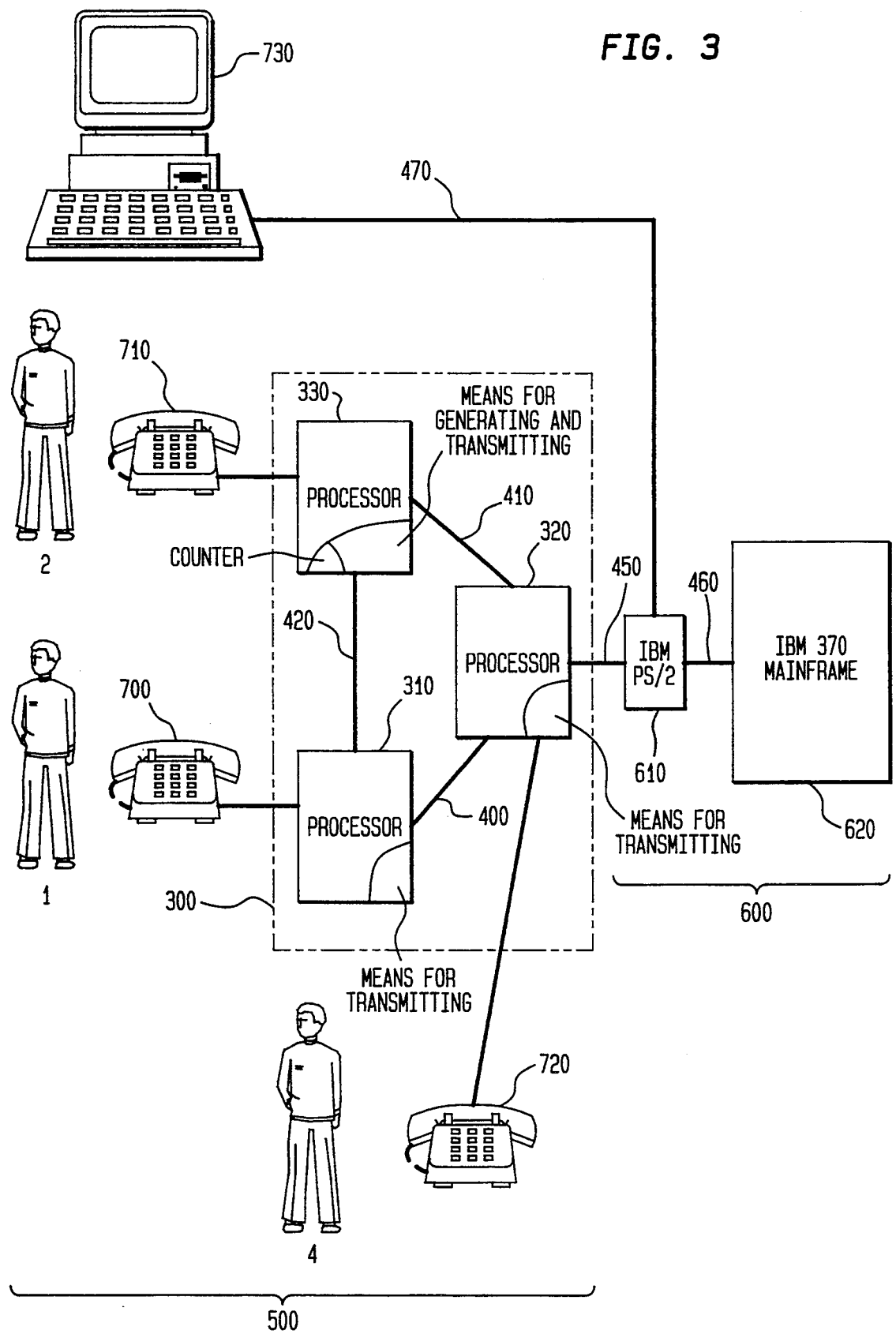

ative status messages relating to user 100 calling user
CENTRALIZED MONITORING OF ACTIVITY IN A DISTRIBUTED PROCESSING SYSTEM

CROSS-REFERENCE TO RELATED APPLICATION

This is a continuation of Ser. No. 07/514,986 filed Apr. 26, 1990 now abandoned.

TECHNICAL FIELD OF THE INVENTION

The present invention pertains to method and apparatus for centralized monitoring of activity in a distributed processing system.

BACKGROUND OF THE INVENTION

FIG. 1 shows a system which comprises distributed processing system 80 and monitor 60. Distributed processing system 80 is comprised of processors 20 and 30 which interact independently with users to generate activity in the form of events. Processors 20 and 30 of distributed processing system 80 communicate with each other over communications link 40 and distributed processing system 80 interacts, in turn, with monitor 60 by means of a connection between monitor 60 and processor 30 over communications link 50. Monitor 60 is an independent processing system which monitors the activity generated by users of distributed processing system 80, i.e., the activity generated by users which interact with processor 20 and the activity generated by users which interact with processor 30. Further, monitor 60 responds to this activity by taking action such as, for example, by supplying information to users from a data base which is connected with monitor 60.

FIG. 2 shows a system which comprises distributed processing system 90, monitor 60, and communications link 70. Communications link 70 facilitates interaction between processor 20 and monitor 60.

As shown in FIGS. 1 and 2, processors 20 and 30 are independent processors and they are connected to each other by means of communications links in order to form distributed processing systems 80 and 90, respectively, which are, for example, private business exchanges (PBX) o As such, processors 20 and 30 independently generate activity status messages pertaining to user activity associated therewith that are sent to monitor 60, for example, an external processor. In order for processor 20 to transmit an activity status message to monitor 60 in the system shown in FIG. 1, processor 20 is required to first transmit the activity status message to processor 30 where it is, in turn, relayed to monitor 60. In order for processor 20 to transmit an activity status message to monitor 60 in the system shown in FIG. 2, however, processor 20 transmits the activity status message directly to monitor 60.

Monitor 60 tracks the relative sequence of activity status messages generated by processors 20 and 30 in order to perform its duty, for example, of supplying centrally maintained data to certain users of the distributed processing systems. However, as has been explained above, since processors 20 and 30 act independently, the order in which activity status messages are received by monitor 60 may be different from the order in which they are generated in the distributed processing systems.

A problem which arises in the centralized monitoring of activity generated by a distributed processing system can best be understood in the context of a simple example. Consider the arrangement shown in FIG. 1 and assume that distributed processing system 80 comprises a computerized private branch exchange (CBX) and that the users represent telephone users. Further assume that user 100 is connected to processor 20 and that user 100 attempts to call user 110 who is connected to processor 30. Still further assume that: (a) CBX 80 sets up a communications path between user 100 and user 110; (b) for some reason the communications path between user 100 and user 110 is terminated quickly, for example, because user 100 hangs up; and (c) immediately after the termination of the communications path between user 100 and user 110, user 120, who is connected to processor 30, attempts to place a call to user 110. Lastly, assume that in the systems shown in FIGS. 1 and 2, the processor which is connected to a user who initiates an activity contains the most current and accurate user data for the overall call activity status relating to that user and, as a result, that processor transmits activity status messages relating to such activity to monitor 60. As a result, in this example, processor 20 transmits activity status messages relating to user 100 calling user 110. However, as was described above and as can be seen from FIG. 1, activity status messages transmitted by processor 20 must first be transmitted to processor 30 where they are transmitted subsequently by processor 30 to monitor 60. As one can readily appreciate, such a rerouting of messages adds a delay in the transmission of activity status messages from processor 20. Further, in the example described above, processor 30 transmits activity status messages relating to user 120 calling user 110 and such activity status messages will be transmitted from processor 30 directly to monitor 60. As a result, under certain circumstances, activity status messages originating in processors 20 and 30 will be received by monitor 60 out of time sequence with respect to the underlying events which caused them. This result of having activity status messages transmitted to monitor 60 out of time sequence can occur in the system of FIG. 1, for example, as a consequence of the geography of the architecture of distributed processing system 80 or it can be due to the fact that processor 20 may be performing a greater amount of processing than processor 30 is performing at a particular point in time. Further, this result of having activity status messages transmitted to monitor 60 out of time sequence can also occur in the system shown in FIG. 2, for example, as a consequence of other processing that is being performed on processors 20 and 30 or it can be due to inherent variable attributes of various components of communications such as, for example, software buffering, hardware buffering, and/or physical transmission delays.

The receipt of messages by monitor 60 out of time sequence order can cause problems for the overall system. Again, this can best be understood in the context of a simple example. Assume that monitor 60 has access to or maintains a centralized data base system and that monitor 60 retrieves data relating to an incoming call and displays that data on a display device for an agent which receives calls from users. In the example given above, assume that the agent is represented by user 110 and, as a result, the proper sequence of activities should be that the data which is displayed at the terminal for the agent should be data that relates to user 120 since user 100 called the agent, i.e., user 110, and hung up rapidly. However, if the activity status messages which related to the above-described senario were received by monitor 60 out of time sequence, then monitor 60 would display information relating to user 100 while the agent, i.e., user 110, would be speaking over the telephone with user 120. As one can readily appreciate, this is a situation which should be avoided.

As a result of the above, there is a need for a method and apparatus for centralized monitoring of activity in a distributed processing system which permits a monitor to decipher the relative time sequence of events which occur in the distributed processing system.

SUMMARY OF THE INVENTION

Embodiments of the present invention advantageously satisfy the above-identified need in the art and provide method and apparatus for centralized monitoring of activity in a distributed processing system which interacts with users and permits a monitor to decipher the relative time sequence of events which occur in the distributed processing system. Specifically, an embodiment of the inventive method comprises the step of generating information which can be used to decipher the relative time sequence of events which generate activity status messages and the step of transmitting this information to the monitor along with the activity status messages. In particular, consider a distributed processing system, such as, for example, a telephony distributed processing system, wherein: (a) a first user, referred to as an initiator user, uses the distributed processing system to interact with a second user, referred to as a target user and (b) the initiator user interacts with a portion of the distributed processing system which is referred to as an initiator processor and the target user interacts with a portion of the distributed processing system which is referred to as a target processor. In such a system, in accordance with the inventive method, a target processor is responsible for generating the information, referred to as a called target number (CTN), for each attempt of an initiator processor to interact with the target user. Further, in accordance with the inventive method, the target processor transmits the CTN back to the initiator processor and the initiator processor transmits the CTN along with an activity status message to the monitor, which activity status message relates to the specific interaction between the initiator user and the target user. Note that a CTN is not a data communication message sequence number in that CTNs for sequential messages are not required to be strictly sequential. Instead, CTN merely supplies information which can be used to derive knowledge of relative sequence. Further note that, in accordance with a preferred embodiment of the present invention: a CTN is only transmitted with activity status messages which refer to events which originate from an initiator user and not by events which are initiated by a target user; a CTN is only transmitted with activity status messages which originate from an initiator processor in the distributed processing system; and a CTN is updated within a target processor independent of other processors.

In a preferred embodiment of the present invention, a CTN is comprised of a processor identification, for example, a target processor identification, and a number which identifies the CTN as referring to the nth event relating to the target processor. For example, in a preferred embodiment of the present invention, a CTN comprises one byte to identify a target processor within a distributed processing system and two bytes which represent a counter which is incremented by the target processor. In one embodiment, a counter is cycled between 0 and 32,767 and, when the counter reaches 32,767, it is reset to 0.

BRIEF DESCRIPTION OF THE DRAWING

A complete understanding of the present invention may be gained by considering the following detailed description in conjunction with the accompanying drawing, in which:

FIG. 3 shows, in pictorial form, a distributed telephony system which utilizes an embodiment of the inventive method.

DETAILED DESCRIPTION

Figure 1:
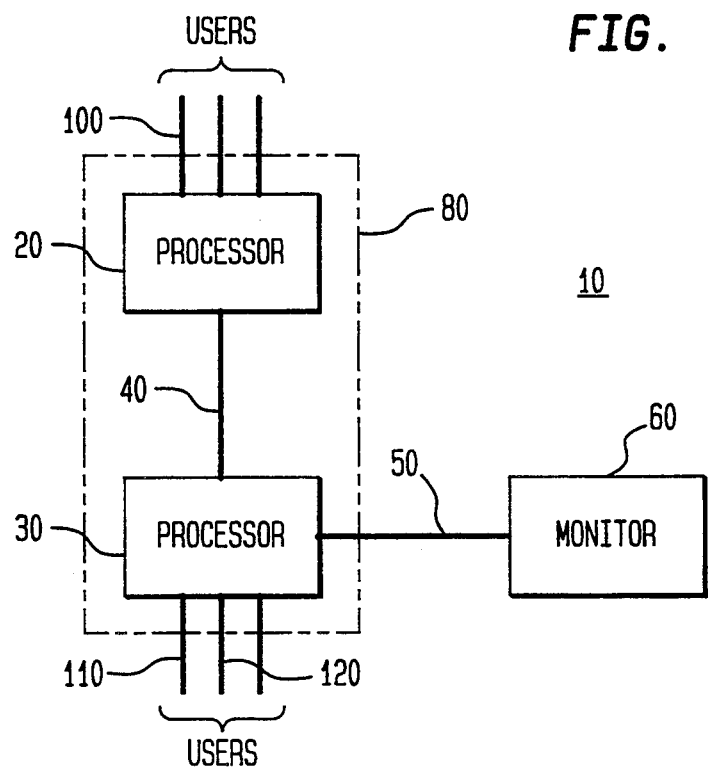
FIG. 1 shows, in pictorial form, a system comprised of a first configuration of a distributed processing system and a monitor.
Figure 2:
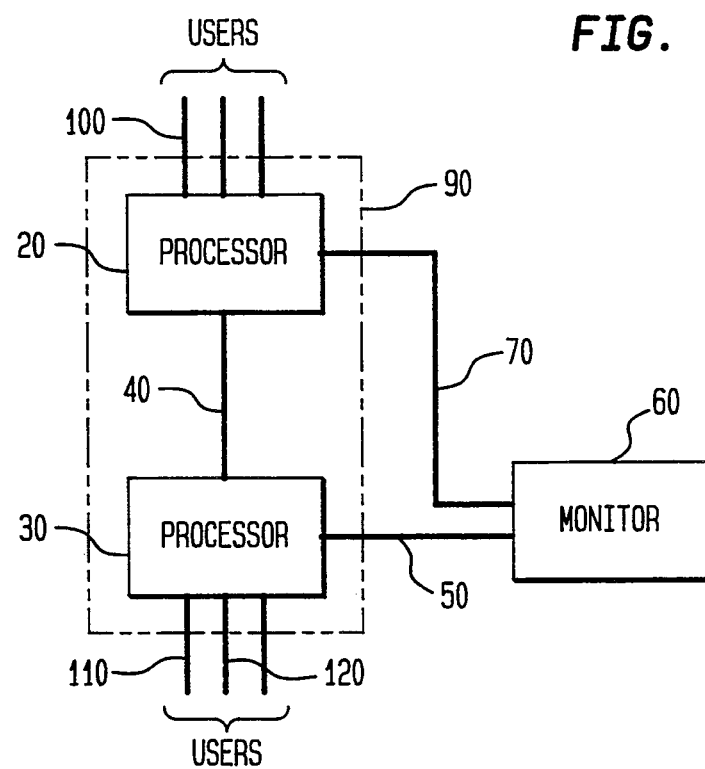
FIG. 2 shows, in pictorial form, a system comprised of a second configuration of a distributed processing system and a monitor.

FIG. 3 shows, in pictorial form, distributed processing system 500 which utilizes an embodiment of the inventive method and which interfaces with monitor system 600. As shown in FIG. 3, distributed processing telephony system 500 is comprised of CBX multi-node switch 300 and telephones 700, 710, and 720. CBX multi-node switch 300 is, itself, comprised of processing systems 310, 320, and 330. Processing systems 310, 320, and 330 are interconnected by a local area network (LAN) which is comprised of: (a) communications link 400 between processors 310 and 320; (b) communications link 410 between processors 320 and 330; and (c) communications link 420 between processors 310 and 330. CBX multi-node switch 300 is connected to monitor 600 by means of RS232 link 450. Monitor 600 is comprised of: (a) IBM PS/2 interface 610 which interacts with CBX multi-node switch 300 over RS232 communications link 450 to processor 320 and (b) IBM 370 Mainframe 620 which interacts with IBM PS/2 interface 610 over LU6.2 communications link 460.

As further shown in FIG. 3: (a) user 1 is connected to CBX multi-node 300 by means of a connection between telephone 700 and processor 310; (b) user 2 is connected to CBX multi-node 300 by means of a connection between telephone 710 and processor 330; (c) user 4 is connected to CBX multi-node 300 by means of a connection between telephone 720 and processor 320; and (d) user 2 is connected to IBM 370 Mainframe 620 by means of terminal 730 and communications link 470 between terminal 730 and IBM PS/2 610. As one of ordinary skill in the art can readily appreciate, user 2 may have information displayed for him or her at terminal 730. The system shown in FIG. 3 is essentially the IBM CallPath System which is comprised of three major components: (a) IBM 370 Host 620 and CallPath software manufactured by the IBM Corporation; (b) a CBX 9751 multi-node switch 300 which is manufactured by ROLM Systems of Santa Clara, Calif.; and (c) IBM PS/2 interface 610 which is manufactured by IBM Corporation.

The following describes a sequence of events which occurs in the overall system shown in FIG. 3, i.e., the system comprised of CBX multi-node switch 300, monitor 600 and the associated telephones and terminals. The sequence of events occurs when two users, for example, users 1 and 4, call a single user, for example, user 2. First, we will describe the manner in which these are handled without the use of the present invention in order to better illustrate the manner in which embodiments of the present invention operate to solve the problems inherent in the overall system.

The first event occurs when user 1 uses telephone 700 to call user 2 at telephone 710. When this occurs, switch 300 sends an activity status message to monitor 600 over communications link 450 to inform monitor 600 that user 1 has placed a call to user 2. In response, monitor 600 retrieves information relevant to user 1 from, for example, a data base which resides in or is accessed by IBM 370 Mainframe 620. This information is transferred to IBM PS/2 interface 610 over communications link 460 and is transferred, in turn, to terminal 730 where it is displayed for user 2.

The second event occurs when user 1 hangs up telephone 700. When this occurs, switch 300 sends an activity status message to monitor 600 over communications link 450 to inform monitor 600 that user 1 has disconnected from user 2. In response, monitor 600 performs the relevant clean-up functions of the screen of terminal 730 and, optionally, may update the information relevant to user 1 in response to information input by user 2 as a result of a conversation between user 1 and user 2.

The third event occurs when user 4 uses telephone 720 to call user 2 at telephone 710. When this occurs, switch 300 sends an activity status message to monitor 600 over communications link 450 to inform monitor 600 that user 4 has placed a call to user 2. In response, monitor 600 retrieves information relevant to user 4 from, for example, a data base which resides in or is accessed by IBM 370 Mainframe 620. This information is transferred to IBM PS/2 interface 610 over communications link 460 and is transferred, in turn, to terminal 730 where it is displayed for user 2.

The fourth event occurs when user 4 hangs up telephone 720. When this occurs, switch 300 sends an activity status message to monitor 600 over communications link 450 to inform monitor 600 that user 4 has disconnected from user 2. In response, monitor 600 performs the relevant clean-up functions of the screen of terminal 730 and, optionally, may update the information relevant to user 4 in response to information input by user 2 as a result of a conversation between user 2 and user 4.

Since CBX multi-node switch 300 is a multi-node system, activity status messages which are transmitted from switch 300 to monitor 600 might arrive out of order. For example, activity status messages may be delayed to such an extent that the following could occur and cause monitor 600 to respond inappropriately. For example, the first activity status message in the above-described series of events which is received by monitor 600 from switch 300 is that user 4 has placed a telephone call to user 2. In response, monitor 600 will provide information for display at terminal 730 corresponding to user 4. The next activity status message which is received by monitor 600 from switch 300 is that user 1 has placed a telephone call to user 2. In response, monitor 600 will clean-up the screen at terminal 730 and monitor 730 will then provide information for display at terminal 730 corresponding to user 1. The next activity status message which is received is that user 1 has hung up the telephone. In response, monitor 600 will clean-up the screen at terminal 730. As one can readily appreciate, monitor 600 has produced inappropriate results.

Embodiments of the present invention solve this problem by utilizing a called target number (CTN) which provides information to monitor 600 which allows it to determine whether activity status messages were transmitted thereto out of order. Specifically, in accordance with a preferred embodiment of the present invention, a CTN comprises a major CTN and a minor CTN. A major CTN is a node identifier which identifies nodes of the distributed processing system. For example, with reference to switch 300 of FIG. 3, each of processors 310, 320, and 330 is a node and each such node is assigned a unique node identifier such as, for example, a node number. Thus, in accordance with the preferred embodiment, the major CTN is one byte which comprises a node identifier of the node which assigned the CTN, i.e., the assignment node. Further, the minor CTN is, for example, the current value of an incremental counter that counts, for example, from 0 to 32,767 decimal. Thus, in accordance with the preferred embodiment, the minor CTN is two bytes which comprises the value of a counter. As a result, CTN is thus CTN(assignment node identifier, counter value).

Further, in accordance with the present invention, a CTN is assigned by the node which interacts with a called user, which node is referred to as a target node, and a CTN is updated within the target node independent of other nodes. The target node assigns the CTN and the CTN is then transmitted back to the caller user's node, which node is referred to as an initiator node, for the initiator node's use in transmitting an activity status message to the monitor. Note that, in the telephony system described herein, CTN is needed for activity status messages that refer to events which are initiated by the caller user, i.e., the initiator user, and CTN is not needed for activity status messages that refer to events which are initiated by the called user, i.e., the target user. Thus, CTN is only included in activity status messages that refer to events which are initiated from a caller user's node. In addition, a CTN need not be used for every initiator user generated event because certain types of initiator user generated events are possible which do not lead to the type of "race" conditions that have been discussed above. For example, in the telephony system described herein, CTN is only provided for initiator events relating to a new target user and to such events which occur at the start of new call since only such events can lead to a "race" condition. As such, it is within the spirit of the present invention that embodiments exist wherein only certain predetermined types of events in a system utilize CTNs and that other embodiments exist wherein every event in the system requires the use of a CTN.

We will now describe how the inventive method utilizes CTN to solve the problems which occur in the above-described example.

The first event occurs when user 1 uses telephone 700 to call user 2 at telephone 710. Processor 330 rings telephone 710 and generates a CTN relating to caller 1 at telephone 700, i.e., CTN(processor 330, counter for event #1)—we will refer to this below as CTN(#330,37), where 37 is the value of the counter for event #1. Then, processor 330 sends CTN(#330,37) back to processor 310 over the LAN via communications link 420 and updates its counter by 1—if the counter hits a predetermined maximum value, it is recycled, i.e., it is reset to 0. Switch 300 then arranges to send an activity status message to monitor 600 over communications link 450 to inform monitor 600 that user 1 has placed a call to user 2. This arrangement occurs when processor 310 which is handling the user 1 request over telephone 700, queues up an activity status message to be sent to monitor 600. The activity status message notifies monitor 600 that a call set up is being made to user 2 at telephone 710. As an example, such an activity status message takes the following form: CALL ASSIGN(phone 700, phone 710, CTN(#330,37)). This activity status message is placed in a queue for routing to monitor 600 by transmission, first, to processor 320 over the LAN via communications link 400, and, from there, to interface 610 over communications link 450.

The second event occurs when user 1 hangs up telephone 700. When this occurs, switch 300 arranges to send an activity status message to monitor 600 over communications link 450 to inform monitor 600 that user 1 has disconnected from user 2. This arrangement occurs when processor 310 which is handling the user 1 request over telephone 700, queues up an activity status message to be sent to monitor 600. The activity status message notifies monitor 600 that a call disconnect is being made to user 2 at telephone 710. As an example, such an activity status message takes the following form: CALL DISCONNECT(phone 700, phone 710). Note that there is no CTN appended to this activity status message because the activity concerning phone 700 and phone 710 involves the same target, i.e., there is no new target involved. Further, the "call disconnect" activity status message cannot lead to a "race" condition with respect to a "call assign" activity status message since such a "call assign" activity status message would include a CTN, which CTN would enable the monitor to determine the order of calls involving user 1 on telephone 700. This "call disconnect" activity status message is placed in a queue for routing to monitor 600 by transmission, first, to processor 320 over the LAN via communications link 400, and, from there, to interface 610 over communications link 450.

The third event occurs when user 4 uses telephone 720 to call user 2 at telephone 710. Processor 330 rings telephone 710 and generates a CTN relating to caller 4 at telephone 720, i.e., CTN(processor 330, counter for event #3)—we will refer to this below as CTN(#330, 41), where 41 is the value of the counter for event #3. Then, processor 330 sends CTN(#330,41) back to processor 320 over the LAN via communications link 410 and updates its counter by 1—in this example, 41 is the value of the counter which has incremented by 1 over the last value which was used, assuming that other events have intervened between the events we are discussing. Switch 500 then arranges to send an activity status message to monitor 600 over communications link 450 to inform monitor 600 that user 4 has placed a call to user 2. This arrangement occurs when processor 320 which is handling the user 4 request over telephone 720, queues up an activity status message to be sent to monitor 600. The activity status message notifies monitor 600 that a call set up is being made to user 2 at telephone 710. As an example, such an activity status message takes the following form: CALL ASSIGN(phone 720, phone 710, CTN(#330,41)). This activity status message is placed in a queue for routing to monitor 600 by processor 320 to interface 610 over communications link 450.

Now we will discuss how these activity status messages are used by monitor 600.

Assume that the activity status messages which are sent to monitor 600 arrive in the following order: CALL ASSIGN(phone 720, phone 710, CTN(#330,41)); CALL ASSIGN(phone 700, phone 710, CTN(#330,37)); and CALL DISCONNECT(phone 700, phone 710). These activity status messages will be placed in a queue and monitor 600 will respond to these three activity status messages in its queue as follows. First, in response to the first activity status message, i.e., CALL ASSIGN(phone 720, phone 710, CTN(#330,41)), monitor 600 will retrieve information relevant to user 4 from, for example, a data base which resides in or is accessed by IBM 370 Mainframe 620. This information is transferred to IBM PS/2 interface 610 over communications link 460 and is transferred, in turn, over link 470 to terminal 730 where it is displayed for user 2. For example, user 2 may be a loan department agent and, in such a case, a display screen of loans will be presented which correspond to user 4.

Second, in response to the second activity status message, i.e., CALL ASSIGN(phone 700, phone 710, CTN(#330,37)), monitor 600 will recognize that a screen is already in use at user 2 terminal. Although the second activity status message, by itself, suggests that monitor 600 should present a new screen to terminal 730 which is associated with user 2, when the second activity status message is taken together with the first activity status message, monitor 600 will ignore the second activity status message. This is because the CTN for the second activity status message indicates that the activity status message relates to target node processor 330, as did the first activity status message. However, the second part of the CTN for the second activity status message equals 37 and 37 was generated earlier than 41, i.e., the corresponding portion of the CTN for the first activity status message. As a result, monitor 600 is prevented from clearing an active screen and destroying the information related to current user 4. Finally, in response to the third activity status message, i.e., CALL DISCONNECT(phone 700, phone 710), monitor 600 will discard this activity status message because monitor 600 will recognize that it refers to an inactive call.

In practice, a CTN will have an indeterminate value when a monitor first begins its monitoring operation since the CTNs are generated by the distributed processing system independently of when a monitor is activated. Further, as one of ordinary skill in the art can appreciate, although CTNs may be generated in ascending order in increments of one from a target node, there may not be an activity status message transmitted to the monitor for each CTN that is generated. As a result, the monitor may not receive consecutively numbered CTNs. Still further, a CTN need not be generated for each target user access. For example, if a target is a trunk in a telephony system, CTNs may not be required since the need for CTNs due to race conditions may be avoided by the required reseize delay of trunks of a minimum of 500 ms, which time is typically more than enough time to produce a steady state and avoid a race condition. Lastly, in practice, processor nodes are designed to reset the CTN counter to zero whenever a restart occurs within that node, a restart being, for example, a minor system reset that maintains the system state by keeping active calls in progress.

In the preferred embodiment described above, a minor CTN has a value in the range between 0 and 32,767 decimal. As a result, because: (a) this range of values is finite; (b) the value rolls over to 0 once the maximum of the range is reached; and (c) the value could cycle around to the same number in the time, for example, 24 hours, it takes to make 32,767 calls to a given node, it is necessary for the monitor to take some precautions in using these values in certain applications. For example, in one such application, the IBM CallPath application discussed above, the following assumptions are made concerning system performance: (a) two minutes is a sufficient amount of time between messages for a single target to avoid the "race" conditions that the use of CTN solves and (b) any given target node will not produce more than 1000 CTNs in two minutes. As those of ordinary skill in the art will appreciate, the design of any real time system will entail the use of certain assumptions regarding the environment which is served thereby.

In the CallPath application, monitor 620, i.e., IBM 370 monitor 620, uses a table to store records of the currently relevant, active transactions, i.e., CallPath calls. Because this application occurs in a telephony environment, as was described above, monitor 620 is only concerned with the initial activity status messages for a new transaction to determine whether any "race" conditions have occurred. When an activity status message is received by monitor 620 it is assigned a time. Monitor 620 then searches the table, using the telephone number fields, to see if an "active" record pertaining to a transaction involving the parties exists. If there is such an "active" record, monitor 620 determines whether the record is more than two minutes old. This is done because, if such an "active" record is less than two minutes old, then a "race" condition could exist, i.e., two activity status messages regarding an initial transaction have been received involving the telephone number and we have determined that the CTNs have not had time to "cycle" around to the same number since we do not expect to process 32,767 telephone calls within two minutes. Thus, if the two messages are more than two minutes apart, the older message is discarded.

If a newly received activity status message has arrived less than two minutes after a previously received activity status message relating to the same telephone number, the CTNs of the two activity status messages are then compared. In this embodiment, this comparison assumes that for this application no more than 1000 CTNs will be generated from a given node within two minutes—1000 was chosen for this application to be a number which is small enough that it is minimal when compared to 32,767 and, yet, is large enough to cover almost all race conditions which occur for the specific telephony application, given the limitation of a maximum of 32,768 possible CTNs. If the difference between the CTN of the most recently received activity status message and the CTN of the previously received activity status message is less than 1000, then the CTN counter has not wrapped around and monitor 620 accepts the activity status message having the larger CTN. However, since we have assumed that the difference between the CTNs must be less than 1000 within the two minute window, if the difference between the CTN of the most recently received activity status message and the CTN of the previously received activity status message is greater than 1000, then the CTN counter has wrapped around. In this case, monitor 620 accepts the activity status message of the smaller CTN since it was generated later in time.

Finally, those skilled in the art recognize that further embodiments of the present invention may be made without departing from its teachings.

What is claimed is:

1. Method for centralized monitoring and responding to activity in a distributed processing system by a monitor wherein users, referred to as initiator user, interact with portions of the distributed processing system which are referred to as initiator processors, in order to interact with other users, referred to as target users and wherein the target users interact with portions of the distributed processing system which are referred to as target processors, the method comprising the steps of:

one of the target processors generating information which can be used to determine relative time sequences of events within predetermined classes of events, which information comprises information which identifies the one of the target processors;

the one of the target processors transmitting the information to one of the initiator processors;

the one of the initiator processors appending the information to an activity status message pertaining to one of the predetermined classes of events at the one of the initiator processors;

the one of the initiator processors transmitting the information with the activity status message to the monitor;

the monitor receiving and storing activity status messages and information from initiator processors; and the monitor analyzing the activity messages and information to determine relative time sequences of events within predetermined classes of events and responding to the activity messages in sequences in accordance with the relative time sequences.

2. The method of claim 1 wherein the step of generating comprises the one of the target processors generating at least a portion of the information in response to a request from the one of the initiator processors.

3. The method of claim 2 wherein the step of generating comprises the step of the one of the target processors generating the at least a portion of the information as information which identifies the one of the target processors uniquely with respect to the other target processors in the distributed processing system.

4. The method of claim 3 wherein the step of generating comprises the step of the one of the target processors generating the at least a portion of the information utilizing information which is maintained by the one of the target processors.

5. The method of claim 4 wherein the step of the one of the target processors generating the at least a portion of the information utilizing information which is maintained by the one of the target processors comprises utilizing information which is maintained independent of any other target processors in the system.

6. The method of claim 4 wherein the step of generating comprises the step of the one of the target processors generating the at least a portion of the information by accessing a counter to obtain the value of the counter.

7. The method of claim 6 wherein the step of the one of the target processors generating the at least a portion of the information by accessing a counter further comprises the step of incrementing the counter by a predetermined amount whenever an event occurs which requires the one of the target processors to take predetermined actions.

8. The method of claim 7 wherein the step of the one of the target processors generating the at least a portion of the information by accessing a counter further comprises the step of recycling the counter after it reaches a predetermined value.

9. Apparatus for use in centralized monitoring and responding to activity in a distributed processing system by a monitor wherein users, referred to as initiator users, interact with portions of the distributed processing system which are referred to as initiator processors, in order to interact with other users, referred to as target users and wherein the target users interact with portions of the distributed processing system which are referred to as target processors, the apparatus comprising:

- means for generating information in response to a request from a target processor, which request is made, in turn, in response to one of a predetermined class of events which occur as a result of a request which is transmitted to the target processor from an initiator processor, which information can be used to determine relative time sequences of events within the predetermined classes of events and which information comprises information which identifies the target processor;
- means for transmitting the information to the initiator processor;
- means, associated with the initiator processor, for transmitting the information to the monitor along with an activity status message pertaining the event
- the monitor comprising means for receiving and storing activity status messages and information from initiator processors; and
- the monitor comprising means for analyzing the activity messages and information to determining relative time sequences of events within predetermined classes of events and means for responding to the activity messages in sequences in accordance with the relative time sequences.

10. The apparatus of claim 9 wherein the means for generating information further comprises means for generating a number which indicates a sequence of events at the target processor.

11. Method for centralized monitoring and responding to activity in a distributed processing system by a monitor wherein user, referred to as initiator users, interact with portions of the distributed processing system which are referred to as initiator processors, in order to interact with other users, referred to as target users and wherein the target users interact with portions of the distributed processing system which are referred to as target processors, the method comprising the steps of:

- one of the target processors generating information which can be used to determine relative time sequences of events within predetermined classes of events, which information comprises information which identifies the one of the target processors and an event sequence at the one of the target processors;
- the one of the target processors transmitting the information to one of the initiator processors;
- generating an activity status message at the initiator processor pertaining to one of the predetermined classes of events;
- the one of the initiator processors transmitting the information with the activity status message to the monitor;
- the monitor receiving and storing activity status messages and information from initiator processors; and
- the monitor analyzing the activity messages and information to determine relative time sequences of events within predetermined classes of events and responding to the activity messages in sequences in accordance with the relative time sequences.

12. The method of claim 11 wherein the step of the one of the target processors generating information comprises the step of generating event sequence information by accessing a counter which is associated with the target processor to obtain a count thereof.

* * * * *